Patented Apr. 10, 1951

2,548,504

UNITED STATES PATENT OFFICE 2,548,504

COPOLYMERS OF 3,4 OR 3,5-DICHLORO ALPHA METHYL-STYRENE WITH FLUORO-ETHYLENES

Theodore A. Te Grotenhuis, Olmsted Falls, and Gilbert H. Swart, Akron, Ohio, assignors to The General Tire and Rubber Company, Akron, Ohio, a corporation of Ohio No Drawing. Application August 28, 1946, Serial No. 693,586

7 Claims. (Cl. 260—87.5)

This invention relates to resinous copolymers of nuclearly polyhalogenated alpha-alkylarylvinyl compounds and to a method of preparing the same.

It is known that dichlorostyrenes such as the 1-vinyl-2,4-dichlorobenzene and the 1-vinyl-2,5-dichlorobenzene, and others, may be polymerized and copolymerized to produce rubbers or resins having especially desirable properties. Thus, the rubbery copolymer of one or more butadiene compounds and a mixture of the isomers of dichlorostyrene has properties in several respects superior to those of natural rubber for tire treads and the like. The dichlorostyrenes are somewhat disadvantageous, however, in that they tend to homopolymerize with exceedingly great rapidity. This fact necessitates the use of a substantial amount of inhibitor during their preparation and storage; it also requires that they be stored at relatively low temperature at all times prior to use. The result of this extreme activity toward polymerization renders their preparation and the preparation of copolymerization products relatively more expensive than would otherwise be the case.

It is found that the 2-(halophenyl) propenes that have a plurality of halogen atoms in the nucleus, like 2-(phenyl) propenes, have little, if any, noticeable tendency for homopolymerization unless they also have a halogen substituted for one of the hydrogens of the terminal methylene group. Unlike 2-(phenyl) propene, however, the 2-(alkyl) 2-(polychlorophenyl) alkenes-1, such as the 2-(dichlorophenyl) propenes, having the propene group free of halogen, do not necessarily copolymerize with other materials such as butadiene, vinyl chloride, dichlorostyrenes and the like. In fact, we have found that little if any appreciable copolymerization with desirable mono-olefinic polymerizable monomeric materials occurs in the case of polychlorophenyl propenes that were prepared in a manner analogous to the method commercially used for the preparation of dichlorostyrene, i. e. by subjecting cumene (in place of the ethyl benzene) successively to nuclear chlorination, to side-chain chlorination, and subsequent side-chain dehydrochlorination.

Such 2-(polychlorophenyl) propenes consist largely of isomers having chlorine in the 2 and/or 6 nuclear positions i. e. adjacent the nuclear carbon atom carrying the unsaturated side-chain (alkylenyl group). It may be that they are thereby so sterically or otherwise hindered by the large chlorine atom on the ortho carbon that copolymerization as well as polymerization is prevented when methods analogous to those usually used for polymerization of unsaturated materials are relied on. In any event, we have been unable to polymerize or copolymerize these materials with polymerizable mono-olefinic monomeric materials to obtain desirable products, even though catalysts normally considered as suitable for initiating emulsion and mass polymerization at ordinary temperatures are present.

In our prior application Serial No. 667,728, now abandoned, we pointed out that the alpha-alkylstyrenes, 2-(polyhalophenyl)-2(alkyl) alkylenes-1, such as 2-(polychlorophenyl) propenes, which have a plurality of halogen atoms in the nucleus but which are free of substituents on the carbon atoms next adjacent the carbon atom to which the olefin group is directly connected, copolymerize with suitable mono-olefinic monomers, such as styrene, acrylonitrile, etc. to form resinous materials having especially desirable properties for many applications. Such polyhalogenated alpha-alkylstyrenes are also found to have little tendency to form polymers by themselves (homopolymerize) and, therefore, still retain the advantage of permitting storage for substantial periods of time without the usual inhibitors.

They may be prepared by any suitable process, as for example by the alkylation by propene of an orthodihalobenzene, such as orthodichlorobenzene, and subsequent dehydrogenation of the alkylated product to yield 2-(3,4-dichlorophenyl) propene. By using higher homologues than propene for alkylation of the halogenated benzene, other alpha-alkylstyrenes halogenated in the nucleus may be prepared. The 2-(alkyl) 2-(polyhaloaryl) ethylenes, i. e. polyhalogenated alpha-alkylstyrenes used in the practice of the present invention, should for best results be substantially free of 2-(alkyl) 2-(chlorophenyl) ethylenes having chlorine on the 2- and/or 6- positions of the nucleus as these materials have a strong tendency to remain unpolymerized in the product. Such unpolymerizable 2-(alkyl) 2-(chlorophenyl) ethylenes may, however, be present to remain as a plasticizer when they are compatible with the final resin. Generally, it is preferred that they do not substantially exceed 25 or 30% of the total amount of polymerizable nuclearly halogenated phenylalkylenes. When, however, the polymerization or copolymerization is accomplished by the use of such strong catalysts as those of the Friedel-Crafts type, say an aluminum chloride-carbon bisulfide or aluminum chloride-ethylene dichloride complex, at low temperatures, such as below −40° C., even substantial amounts of the isopropenylchlorobenzenes having one, two or three chlorine atoms and, having chlorine on the number 2- and/or number 6-nuclear carbon atoms, appear to polymerize and copolymerize to form useful liquid and solid products.

Examples of suitable Friedel-Crafts catalysts that may be used are those set forth in the article entitled "Friedel-Crafts Synthesis" by N. O. Calloway, printed in Chemical Review, vol. XVII, No. 3, 1935, page 375. Chemical Review is published by the American Chemical Society in Baltimore.

In our aforementioned prior application, it was pointed out that the preferred polymerizable comonomers for copolymerization with the aforementioned 2-(alkyl), 2-(polyhalophenyl) ethylenes, such as the 2-(polyhalophenyl) propenes contain a vinyl group >C=C< in which not in excess of two of the four free valences are directly connected to the equivalent number of activating groups selected from groups such for example as phenyl, cyano, substituted phenyl, halogen etc. and the remaining valences are connected to hydrogen and/or alkyl.

It has now been found that especially desirable polymerization products may also be produced by copolymerizing one or more of the aforementioned 2-(alkyl), 2-(polyhalophenyl) ethylenes, having the nuclear carbon atoms next adjacent that carbon atom directly carrying the alkylenyl group free of large halogen, such as chlorine (large chlorine is distinguished from the small fluorine which may be present) with unsaturated ethylenic compounds (compounds containing the vinyl group >C=C<) containing one or more fluorine atoms attached directly to the ethylenic carbon even though as many as two valences are directly connected to additional activating groups, such for example as —CN, —COOR (where R is hydrogen, alkyl, substituted alkyl or an amino group), acid anhydride

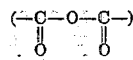

halogenated aryl (especially halogenated phenyl, including all of the isomers of —C₆H₃Cl₂, —C₆H₂Cl₃, C₆H₃F₂ etc.) and halogen groups (including F, Cl, Br and even I). Thus compounds such as tetrafluorethylene, symmetrical and unsymmetrical dichlorodifluoroethylene and trifluoromonochloroethylene, etc., and compounds having one to three fluorine atoms attached directly to the vinyl group and the fourth valence attached to a group selected from hydrogen, alkyl, phenyl, halogenated phenyl, cyanide, ether and carbonyloxy groups, also copolymerize under suitable conditions with the aforementioned isopropenyl benzenes having a plurality of halogen atoms but having the nuclear positions 2 and 6 free of large halogen. Of these, the compounds having four halogen atoms attached to the vinyl group, two to four of which halogens are fluorine, are usually preferred. Compounds having more than one donor group such as aryl, alkyl, oxyalkyl, and

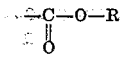

groups and particularly compounds having two such groups attached to one carbon of the vinyl group, usually copolymerize with the aforementioned 2-(polyhalophenyl) propenes with greatest difficulty hence it is generally desirable that the copolymerizable materials be further characterised by having no more than one such donor group directly attached to any one carbon atom.

It has also been found that even ethylene may, under suitable conditions, be copolymerized with the 2-(3,4- or 3,5-dichlorophenyl) propenes with or without additional unsaturated monomeric materials. Thus, when the mixture of the one or more 2-(poly) or 2-(dichlorophenyl) propenes and ethylene having any desired proportion of component monomers, for example ethylene and the aforementioned polymerizable 2-(polychlorophenyl) propene proportioned within the range of 1 to 20 or 20 to 1 and a pressure of at least 200 (preferably 1,000 or more) atmospheres is utilized in conjunction with water to provide an interfacial region for polymerization initiation and a suitable catalyst such as around .2 to .5% of benzoyl peroxide, trimethylamine oxide, or other trialkylamine oxide etc. and an exclusion or absence of atmospheric oxygen, a desirable solid polymer is formed at elevated temperatures such as around 100° C. (50 to 150° C.) in a few hours. One or more other comonomers as the above mentioned fluoride containing comonmers and/or other unsaturated polymerizable materials, such for example as any of those mentioned in our aforementioned prior application, may also be present to vary the properties of the copolymer. The amount of any conjugated diene, however, desirable in resinous compositions is generally not in excess of 25% by weight of the polymerizable ingredients although as much as 40 or even 45% may be present in some instances.

The 2-(3,4- or 3,5-dihalophenyl) propenes are especially desirable for copolymerization with the ethylenic compounds which are subjected to relatively close packing, for example tetrafluorethylene and the like. A small percentage gives increased compatibility with plasticizers without greatly deteriorating the excellent electrical properties normally present in the closely packed polyethylenic compounds. Thus, even a relatively small amount, such as 1% or so, of 2-(3,4- or 3,5-dihalophenyl) propenes has a noticeable effect on the properties of the copolymerization products, particularly those in the case of the monomers of the ethylenic type subject to close packing, such as may be had when only fluorine and/or hydrogen atoms are present on the ethylenic carbon atoms. It is usually preferred to have at least 5 to 10 percent of the aforementioned dihalopropenes present however.

Inasmuch as the 2-(3,4- and 3,5-dichlorophenyl) propenes homopolymerize with considerable difficulty unless a catalyst of the Friedel-Crafts type is present, it is generally preferable to utilize about 50 or 60 mol percent or less of these materials in preparing the copolymers of the present invention. As much as 90 or 95 mol percent may be utilized, if the copolymerization is accomplished at very high pressure or in the presence of a strong catalyst capable of causing homopolymerization or if the excess above 50 mol per cent is desired as a plasticizer or solvent.

The polymerization may be carried out en masse, with or without the addition of a solvent or diluent or with or without the aid of a suitable polymerization catalyst. Either polymerization en masse or the so-called "pearl" or suspension polymerization wherein the mixture of polymerizable materials, with or without a suitable catalyst such as benzoyl peroxide, etc., is strongly agitated in water or in an aqueous solution of a water-soluble resinous polymer such as polymethacrylamide, polymethacrylic acid, polymethylvinyl ether, polyvinyl alcohol and the like is ordinarily preferred when a finely divided clear resin suitable as a molding powder is desired. When one of the materials is water-insoluble and the others are readily soluble, mass polymerization in absence of water is preferred. If a clear resin is not necessary, we prefer to utilize emulsion polymerization, wherein the mixture of polymerizable materials is incorporated in an aqueous solution or suspension of emulsifying agent or protective colloid. Pigments, plasticizers and the like may be present during the polymerization.

The emulsifying agents may be cationic (usually quaternary) ammonium compounds or anionic types. Examples of suitable emulsifying agents which may be used are set forth in the lists of surface-active agents compiled by F. J. Van Antwerpen, published in Industrial and Engineering Chemistry, January 1939, pages 66 to 69; January 1941, pages 16 to 22; and January 1943, pages 126 to 130.

Suitable activators, such as complex salts of cobalt, particularly alkali metal cobaltinitrites and alkali metal aquo hydroxylo nitrito cobaltiates, in conjunction with a mercaptan such as dodecyl mercaptan, as set forth in patent application of John C. Warner and Harry Seltz, Serial No. 577,328, filed February 10, 1945, as well as other activators for emulsion polymerization may be used. Emulsion polymerization usually yields products of higher molecular weight than does mass polymerization.

When one or more of the monomeric materials for copolymerization with the 2-(3,4- or 3,5-dichlorophenyl) propenes is a relatively low boiling gas such as ethylene or the highly fluorinated materials consisting of hydrogen, carbon and halogen, polymerization at exceptionally high pressure, such as above 50 atmospheres and preferably in the neighborhood of about 500 or 1,000 to 3,000 atmospheres, is desirable to obtain sufficient speed. Such polymerization is usually accelerated by eliminating the air from the reactor and maintaining at least some water and a suitable oxidizing catalyst as used for the homopolymerization of ethylene. A temperature around 100° C. as aforementioned or between 50 to 200° or 250° C. is usually desired.

The finely divided resinous compositions of the present invention may be molded directly from their latex or coagulated solid form or the solids may be ground or mixed with a plasticizer and/or solvent (capable of combining therewith at elevated temperature) to form a slurry which may be used as a coating or molding composition, etc., and the thus coated material subjected to heat to cause coalescence of the solid particles and compatibility with plasticizer and remaining solvent. These compositions like others may, for example, be ball mill ground in the presence of a plasticizer which is compatible at non-destructive elevated temperatures, preferably diluted with a solvent or thinner such as a drying oil, a hydrocarbon liquid such as kerosene, etc., and used as a coating or dipping composition. If a dispersing agent such as one or more water-soluble soaps, long chain amines, ink lengthener, is present (preferably during part of the grinding operation), a more flowable slurry or dispersion of finely divided resin is produced in said plasticizer. Hot metal articles (heated above 250° C.) dipped into such a dispersion retain relatively heavy layers thereon. After drying and heating the thus coated article to a temperature of about 300° C., or sufficiently to coalesce the dispersed particles, a coherent protective film of surprising strength may be had over the surface of the metal.

The following examples, in which parts are by weight, illustrate the present invention:

Example 1

| | Parts |
|---|---|
| 2-(3,4-dichlorophenyl) propene | 65 |
| Unsymmetrical difluorodichloroethylene | 35 |
| Water | 200 |
| Benzoyl peroxide | .2 |

The above materials are charged in a silver-lined high pressure autoclave and agitated at about 90° C. for about ten hours. At the end of the time the autoclave is opened and the product is removed, filtered, washed and dried. The finely divided polymer may be used as a molding powder and it may be dissolved in solvent to form a suitable coating composition. When mixed with monomeric 2-(3,4- or 3,5-dichlorophenyl) propene or when mixed with styrene, the product may be used as a contact laminating resin.

Example 2

| | Parts |
|---|---|
| 2-(3,4-dichlorophenyl) propene | 50 |
| Symmetrical difluorodichloroethylene | 50 |

The above materials are substituted for the polymerizable materials of Example 1, other conditions remaining the same. The product has desirable properties for use as a molding powder.

Example 3

A silver-lined reaction vessel which has been purged of oxygen is charged with 200 parts of water, .2 part of benzoyl peroxide and about 50 parts of 2-(3,4-dichlorophenyl) propene. It is then agitated and pressurized with ethylene at about 1500 atmospheres pressure while the autoclave is maintained at a temperature of about 95° C. After about ten hours, the reaction product is removed from the vessel, washed and filtered. The polymer is soluble in aromatic solvents and has desirable electrical properties.

Example 4

A stainless steel-lined high pressure reactor is charged with about 300 parts of water, 70 parts of 2-(3,4-dichlorophenyl) propene, .3 part of trimethylamine oxide hydrate, about .1 part of glacial acetic acid and about 70 parts of tetrafluoroethylene.

The reactor is agitated at about 60 to 65° C. for 10 hours, whereupon after cooling the contents are discharged, washed and dried. The polymer is soluble in solvents and has excellent electrical properties.

Example 5

| | Parts |
|---|---|
| 2-(3,4-dichlorophenyl) propene | 10 |
| Ethylene | 90 |
| Butadiene | 5 |
| Water | 200 |
| Trimethylamine oxide hydrate | 0.25 |

The water which was purged of oxygen, together with the catalyst, is incorporated into a stainless steel-lined high pressure reaction vessel equipped for agitation and the 2-(3,4-dichlorophenyl) propene, ethylene and butadiene, then incorporated. The size of the vessel is such that the pressure is maintained for at least five hours at 1,000 atmospheres and preferably 1,500 to 3,000 atmospheres while the temperature is maintained around 100 to 150° C. Extra ethylene may be added when the pressure falls below 1,000 atmospheres. The polymer which, after eight to ten hours, is removed from the reaction vessel, washed and filtered, is heat softenable but less soluble in organic solvents than the polymer of Example 3, due to perhaps the cross linking of the conjugated butadiene compound.

*Example 6*

When in Example 4 the 2-(3,4-dichlorophenyl) propene is reduced to only 5 parts, a polymer is obtained having properties quite similar to polytetrafluoroethylene but which is substantially more compatible with solvent and plasticizer. The polymer obtained still has exceptionally desirable electrical properties and is suitable for insulation in electrical apparatus.

A small amount of 2-(3,4-dichlorophenyl) propene apparently acts to separate the molecules of the polymer sufficiently to permit greater compatibility with plasticizers and solvents.

In the preceding examples the tetrafluoroethylene may be substituted by trifluoroethylene, trifluoromonochloroethylene, 1-methyl-, 2,2' difluoroethylene, allylene difluoride, allyl esters such as allylfluoride, or 1-(fluoro) 2-(3,4-dichlorophenyl) propene-1, etc. to give solid polymers which also have exceptionally desirable properties. Similarly, the 3,4-dichlorophenyl propylene in the above example may be substituted in whole or in part by 2-(3,5-dichlorophenyl) propene or by corresponding fluorine, bromine or iodine derivatives. Compounds containing a plurality of separated unsaturated carbon-to-carbon linkages, such as double or even triple bonds, may also be present in the compositions of the present invention to give a cross linking that modifies the heat softening point of the resinous materials produced. These compounds are herein termed "polyene" compounds and should be present in amounts of substantially less than 45 per cent of the total polymerizable constituents and only small amounts such as less than 10 or 15 percent are ordinarily desired. Of the polyene compounds, the butadiene compounds which contain conjugated double bonds such as butadiene, isoprene, 1-cyano of 2-cyano butadiene-1,3, piperylene, haloprenes such as chloroprene, fluoroprene, and other conjugated dienes having less than eight carbon atoms in a single chain are ordinarily used because of lower cost or greater availability. The butadiene in Example 5 may be substituted by other butadiene compounds or by other polyenes having carbon-to-carbon unsaturated linkages in nonconjugated relationship to vary the softening points and solubility.

In the above examples, one or more additional monomeric materials such as acrylonitrile, vinyl chloride, vinylidene chloride, styrene or other unsaturated polymerizable monomeric material, as described in our aforementioned prior application, may also be present in the polymerizable mixture to vary the properties of the resultant polymer.

As aforementioned, our prior application Serial No. 667,728, filed May 6, 1946, is directed to copolymers of polychloro-alpha-alkylstyrenes with a copolymerizable mono-olefinic compound having an olefinic group activated or in conjugated relation to a carbon atom having at least two valences thereof satisfied by a single atom. This and other subject matter disclosed and not claimed herein is claimed in this copending application.

It is apparent that modifications of the invention may be made without departing from the spirit thereof and it is intended that the invention be limited only by the appended claims.

What we claim is:

1. A copolymerization product of an alpha-methylstyrene and a member of the group consisting of ethylene and ethylenes having one to four hydrogen atoms substituted by fluorine, said alpha-methylstyrene having two nuclear halogen atoms and having nuclear carbon atoms next adjacent the carbon atom directly carrying the isopropenyl group free of substituents, the amount of alpha-methylstyrene having the above characteristics being 1 to 90 mol per cent of said copolymerization product.

2. A copolymerization product of 3,4-dichloro-alpha-methylstyrene and an ethylene having one to four hydrogen atoms substituted by fluorine, said 3,4-dichloro-alpha-methylstyrene being present in amounts of 1 to 90 mol percent.

3. A copolymerization product of 3,4-dichloro-alpha-methylstyrene and an ethylene having one to four hydrogen atoms substituted by fluorine, said 3,4-dichloro-alpha-methylstyrene being present in amounts of 5 to 60 mol percent.

4. A copolymerization product of tetrafluoroethylene and 3,4-dichloro-alpha-methylstyrene, said copolymerization product having 1 to 50 mol percent of said 3,4-dichloro-alpha-methylstyrene.

5. A copolymerization product of 3,4-dichloro-alpha-methylstyrene and difluorodichloroethylene, said 3,4-dichloro-alpha-methylstyrene being 5 to 60 mol percent of said copolymerization product.

6. A copolymerization product of 3,4-dichloro-alpha-methylstyrene and an unsymmetrical difluorodichloroethylene, said 3,4-dichloro-alpha-methylstyrene being 5 to 60 mol percent of said copolymerization product.

7. A method of making a copolymerization product of an alpha-methylstyrene having a plurality of nuclear halogen atoms, but with the nuclear carbon atom next adjacent the carbon atom carrying the isopropenyl group free of substituents, and an ethylene having one to four hydrogen atoms substituted by fluorine, the steps which comprise incorporating said ethylene in the presence of water, a catalyst and said alpha-methylstyrene in a pressure vessel, and maintaining them under a pressure of at least 50 atmospheres and at elevated temperatures until a solid polymer is formed, said alpha-methylstyrene being 1 to 60 mol percent of the monomeric materials.

THEODORE A. TE GROTENHUIS.
GILBERT H. SWART.

REFERENCES CITED

The following references are of record in the file of this patent:

UNITED STATES PATENTS

| Number | Name | Date |
|---|---|---|
| 2,403,213 | D'Alelio | July 2, 1946 |
| 2,473,985 | Brooks | June 21, 1949 |